United States Patent
Feng et al.

(10) Patent No.: US 11,204,688 B2
(45) Date of Patent: Dec. 21, 2021

(54) VIDEO PLAYING METHOD AND DEVICE, ELECTRONIC EQUIPMENT AND STORAGE MEDIUM

(71) Applicant: Hangzhou Hikvision Digital Technology Co., Ltd., Hangzhou (CN)

(72) Inventors: Zhongjian Feng, Hangzhou (CN); Xiangzhen Chen, Hangzhou (CN); Gang Lv, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/981,100

(22) PCT Filed: Feb. 15, 2019

(86) PCT No.: PCT/CN2019/075261
§ 371 (c)(1),
(2) Date: Sep. 15, 2020

(87) PCT Pub. No.: WO2019/179264
PCT Pub. Date: Sep. 26, 2019

(65) Prior Publication Data
US 2021/0041999 A1    Feb. 11, 2021

(30) Foreign Application Priority Data
Mar. 22, 2018  (CN) .......................... 201810240270.8

(51) Int. Cl.
*G06F 3/0484* (2013.01)
*G06F 3/0481* (2013.01)

(52) U.S. Cl.
CPC .......... *G06F 3/0484* (2013.01); *G06F 3/0481* (2013.01)

(58) Field of Classification Search
CPC . G06F 3/0484; G06F 3/0481; H04N 21/4438; H04N 21/47217;
(Continued)

(56) References Cited

U.S. PATENT DOCUMENTS 6,928,624 B1 * 8/2005 Estipona ............... G06F 3/0481
715/790
8,402,494 B1   3/2013 Hu et al.
(Continued)

FOREIGN PATENT DOCUMENTS

CN   101334740   12/2008
CN   102612687   7/2012
(Continued)

OTHER PUBLICATIONS

International Search Report and Written Opinion issued in Corresponding PCT Application No. PCT/CN2019/075261, dated May 13, 2019 (English Translation provided).
(Continued)

*Primary Examiner* — Michael Roswell
(74) *Attorney, Agent, or Firm* — Norton Rose Fulbright US LLP

(57) ABSTRACT

A method and apparatus for video playing, an electronic device and a storage medium are provided. In the method, a web service program calls a preset interface to create a video window; the video window is displayed in a page in which the current window of a browser is located; a video playing instruction is received; and a video corresponding to the video playing instruction is played in the video window. In the present application, a video window is created through a web service program; the created video window is displayed in the page in which the current window of the browser is located, and then the video is played through the video window. In this way, the video may be played without
(Continued)

loading a plug-in, achieving the purpose of playing a video on a page of a browser without using a plug-in.

17 Claims, 4 Drawing Sheets

(58) Field of Classification Search
CPC ......... H04N 21/47202; H04N 21/4316; H04N 21/643; H04N 21/4782
USPC ........................................................ 715/719
See application file for complete search history.

(56) References Cited

U.S. PATENT DOCUMENTS

| | | | |
|---|---|---|---|
| 8,644,674 B2* | 2/2014 | Anderson | H04N 21/4622 386/240 |
| 2002/0126142 A1* | 9/2002 | Hodgkinson | H04N 5/445 715/719 |
| 2002/0140719 A1* | 10/2002 | Amir | H04N 21/8549 715/716 |
| 2009/0006213 A1* | 1/2009 | Lerman | G06Q 30/0277 705/14.61 |
| 2011/0113354 A1 | 5/2011 | Thiyagarajan et al. | |
| 2011/0138354 A1* | 6/2011 | Hertenstein | G06F 8/38 717/115 |
| 2014/0181947 A1 | 6/2014 | Lund | |
| 2015/0370759 A1* | 12/2015 | Liu | G06F 3/04847 715/204 |
| 2016/0142760 A1 | 5/2016 | Son | |
| 2016/0205185 A1 | 7/2016 | Gampel et al. | |
| 2019/0068687 A1* | 2/2019 | Masi | G06F 3/0486 |

FOREIGN PATENT DOCUMENTS

| | | |
|---|---|---|
| CN | 102663003 | 9/2012 |
| CN | 103024526 | 4/2013 |
| CN | 103442034 | 12/2013 |
| CN | 103793224 | 5/2014 |
| CN | 104093060 | 10/2014 |
| CN | 104113570 | 10/2014 |
| CN | 104268251 | 1/2015 |
| CN | 104469475 | 3/2015 |
| CN | 104469516 | 3/2015 |
| CN | 105100824 | 11/2015 |
| CN | 105681841 | 6/2016 |
| CN | 105868418 | 8/2016 |
| CN | 105898608 | 8/2016 |
| CN | 107257510 | 10/2017 |
| CN | 107277004 | 10/2017 |
| CN | 107277612 | 10/2017 |
| CN | 107786906 | 3/2018 |

OTHER PUBLICATIONS

Extended European Search Report issued in Corresponding European Application No. 19771426.4, dated Feb. 9, 2021.
Office Action issued in Corresponding Chinese Application No. 201810240270.8, dated Jul. 2, 2021 (English Translation provided).

* cited by examiner

VIDEO PLAYING METHOD AND DEVICE, ELECTRONIC EQUIPMENT AND STORAGE MEDIUM

The present application is a national phase application under 35 U.S.C. 0371 of International Application No. PCT/CN2019/075261, filed Feb. 15,2019, which claims the benefit of priority to Chinese Patent Application No. 201810240270.8, filed with the China National Intellectual Property Administration on Mar. 22, 2018 and entitled "Method for video playing and device, electronic device and storage medium", each of which are incorporated herein by reference in their entirety.

TECHNICAL FIELD

The present application relates to the technical field of video playing, and in particular to a method for video playing and an apparatus for video playing, an electronic device and a storage medium.

BACKGROUND

A plug-in has been commonly used in a browser. After a plug-in is embedded in a browser, the browser can directly call the plug-in, for example, an NPAPI plug-in or an ActiveX plug-in, to play a video.

Since the plug-in was invented in the 1990s when the network environment was relatively simple, and the developer at that time basically ignored a security problem, the permission of the plug-in is higher than other programs. This enables the plug-in to modify and call a file in a system during the browser calling the plug-in, which will result in a serious security problem. Therefore, more and more browsers begin to disable plug-ins currently.

After disabling plug-ins, the browser is unable to play a video by loading the plug-ins. Therefore, a method for playing a video on a web page of a browser without plug-ins is urgently needed.

SUMMARY

The object of the present application is to provide a method for video playing, an apparatus for video playing, an electronic device and a storage medium, so as to play a video on a page of a browser. Specific technical solutions are as follows.

In a first aspect, an embodiment of the present application provides a method for video playing, which is applied to a web service program. The method includes:

calling a preset interface to create a video window;
displaying the video window in a page in which a current window of a browser is located;
receiving a video playing instruction; and
playing a video corresponding to the video playing instruction in the video window.

Optionally, the web service program is a full-duplex communication protocol (websocket) service program or a Hyper Text Transfer Protocol (http) service program.

Optionally, displaying the video window in the page in which the current window of the browser is located comprises:

displaying the video window as a sub-window of the current window of the browser.

Optionally, displaying the video window in the page in which the current window of the browser is located comprises:

displaying the video window in front of the current window of the browser.

Optionally, displaying the video window as the sub-window of the current window of the browser comprises:

obtaining a window handle of the current window of the browser;
setting a window corresponding to the window handle as a parent window of the video window;
determining first initial coordinate information of the video window;
determining a first display zone corresponding to the first initial coordinate information in the parent window; and
displaying the video window in the first display zone.

Optionally, displaying the video window in front of the current window of the browser comprises:

determining second initial coordinate information of the video window;
determining a second display zone corresponding to the second initial coordinate information in the current window of the browser; and
displaying the video window in front of the second display zone.

Optionally, when a position or a size of the current window changes, the method further comprises:

receiving target coordinate information of the video window, wherein the target coordinate information indicates a position to which the video window is to be changed;
determining a target display zone corresponding to the target coordinate information in the page in which the current window of the browser is located; and
displaying the video window in the target display zone.

Optionally, after playing a video corresponding to a video playing request in the video window, the method further comprises:

receiving a video playing control instruction;
determining an operation manner corresponding to the video playing control instruction; and
performing, in the operation manner, a corresponding operation on the video corresponding to the video playing instruction.

In a second aspect, an embodiment of the present application provides an apparatus for video playing, which is applied to a web service program. The apparatus includes:

a creating module configured for calling a preset interface to create a video window;
a display module configured for displaying the video window in a page in which a current window of a browser is located;
a video playing instruction receiving module configured for receiving a video playing instruction; and
a playing module configured for playing a video corresponding to the video playing instruction in the video window.

Optionally, the web service program is a full-duplex communication protocol (websocket) service program or a Hyper Text Transfer Protocol (http) service program.

Optionally, the display module is further configured for displaying the video window as a sub-window of the current window of the browser.

Optionally, the display module is further configured for displaying the video window in front of the current window of the browser.

Optionally, the display module comprises:

a window handle obtaining unit configured for obtaining a window handle of the current window of the browser;

a setting unit configured for setting a window corresponding to the window handle as a parent window of the video window;

a first initial coordinate information determining unit configured for determining first initial coordinate information of the video window;

a first display zone determining unit configured for determining a first display zone corresponding to the first initial coordinate information in the parent window; and a first display unit configured for displaying the video window in the first display zone.

Optionally, the display module comprises:

a second initial coordinate information determining unit configured for determining second initial coordinate information of the video window;

a second display zone determining unit configured for determining a second display zone corresponding to the second initial coordinate information in the current window of the browser; and a second display unit configured for displaying the video window in front of the second display zone.

Optionally, the apparatus further comprises:

a target coordinate information receiving module configured for, when a position or a size of the current window changes, receiving target coordinate information of the video window, wherein the target coordinate information indicates a position to which the video window is to be changed;

a target display zone determining module configured for determining a target display zone corresponding to the target coordinate information in the page in which the current window of the browser is located; and a target display module configured for displaying the video window in the target display zone.

Optionally, the apparatus further comprises:

a video playing control instruction receiving module configured for, after playing a video corresponding to a video playing request in the video window, receiving a video playing control instruction;

an operation manner determining module configured for determining an operation manner corresponding to the video playing control instruction; and a performing module configured for performing, in the operation manner, a corresponding operation on the video corresponding to the video playing instruction.

In a third aspect, an embodiment of the present application provides an electronic device, including a processer and a memory, wherein, the memory is configured for storing a computer program;

the processor is configured for performing the computer program stored on the memory to perform operations of:

calling a preset interface to create a video window;

displaying the video window in a page in which a current window of a browser is located;

receiving a video playing instruction; and playing a video corresponding to the video playing instruction in the video window.

Optionally, the web service program is a full-duplex communication protocol (websocket) service program or a Hyper Text Transfer Protocol (http) service program.

Optionally, displaying the video window in the page in which the current window of the browser is located comprises:

displaying the video window as a sub-window of the current window of the browser.

Optionally, displaying the video window in the page in which the current window of the browser is located comprises:

displaying the video window in front of the current window of the browser.

Optionally, displaying the video window as the sub-window of the current window of the browser comprises:

obtaining a window handle of the current window of the browser;

setting a window corresponding to the window handle as a parent window of the video window;

determining first initial coordinate information of the video window;

determining a first display zone corresponding to the first initial coordinate information in the parent window; and displaying the video window in the first display zone.

Optionally, displaying the video window in front of the current window of the browser comprises:

determining second initial coordinate information of the video window;

determining a second display zone corresponding to the second initial coordinate information in the current window of the browser; and displaying the video window in front of the second display zone.

Optionally, the processor is further configured for:

receiving target coordinate information of the video window, wherein the target coordinate information indicates a position to which the video window is to be changed;

determining a target display zone corresponding to the target coordinate information in the page in which the current window of the browser is located; and displaying the video window in the target display zone.

Optionally, the processor is further configured for:

receiving a video playing control instruction;

determining an operation manner corresponding to the video playing control instruction; and performing, in the operation manner, a corresponding operation on the video corresponding to the video playing instruction.

In a fourth aspect, an embodiment of the present application provides a computer-readable storage medium having stored a computer program therein, wherein the computer program is executed by a processor, so as to cause the processor to perform any method in the first aspect.

In the embodiment of the present application, the web service program calls the preset interface to create the video window, displays the video window in the page in which the current window of the browser is located, receives the video playing instruction, and plays the video corresponding to the video playing instruction in the video window. In the present application, the web service program creates the video window, displays the created video window in the page in which the current window of the browser is located, and plays a video through the video window without loading a plug-in, achieving the purpose of playing a video on the page of the browser without using a plug-in.

BRIEF DESCRIPTION OF THE DRAWINGS

In order to more clearly describe the technical solutions of the embodiments of the present application and of the prior art, drawings that need to be used in embodiments and the prior art will be briefly described below. Obviously, the drawings provided below are for only some embodiments of the present application; those skilled in the art may also obtain other drawings based on these drawings without any creative efforts.

DETAILED DESCRIPTION

In order to make the objectives, technical solutions and advantages of the present application more clear and understandable, the present application will further be described in detail bellow with reference to the drawings and the embodiments. Obviously, the described embodiments are only a part, not all, of the embodiments of the present application. Based on the embodiments in the present application, all other embodiments obtained by those skilled in the art without any creative efforts will fall within the scope of protection of the present application.

A method for video playing according to an embodiment of the present application will be described in detail below through specific embodiments.

The method for video playing according to the embodiment of the present application may be applied to a web (World Wide Web) service program. The web service program, after being activated, runs in back-end, and may communicate with a browser to receive instructions sent by the browser and perform corresponding operations.

Figure 1:
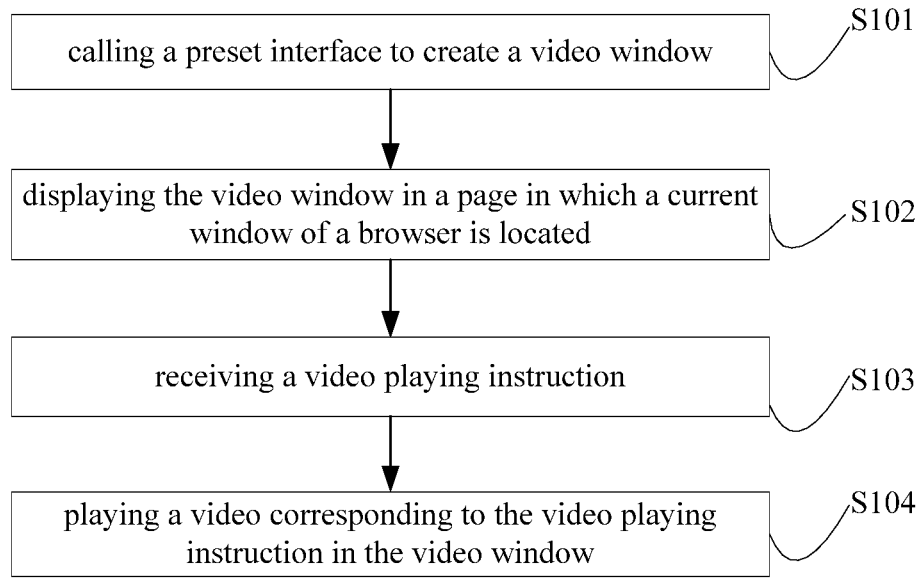
FIG. 1 is a first flow diagram of a method for video playing according to an embodiment of the present application.

FIG. 1 illustrates a method for video playing according to an embodiment of the present application, which is applicable to a web service program. The method may include following steps.

At S101, a preset interface is called to create a video window.

The web service program may be activated on boot or may be set to be activated during activating the browser, which will be not limited herein.

If the web service program has been activated before a user activates the browser, then it is not necessary to activate the web service program again during activating the browser. If the web service program has been deactivated before the browser is activated, then it is necessary to activate the web service program again during activating the browser.

In a possible implementation, the web service program may be a full-duplex communication protocol (websocket) service program or an http (Hyper Text Transfer Protocol) service program.

The websocket protocol is a new network protocol based on TCP (Transmission Control Protocol), which is used for implementing instant communication. The http protocol is a transfer protocol for transferring hypertext, which may improve the efficiency of the browser and reduce network transmission.

After a user activates the browser, if the user wants to watch a video from a certain video website, the user may open a web page of the video website; at this time, the browser sends an instruction for creating a video window to the web service program. Of course, a condition for triggering the browser to send the instruction for creating a video window to the web service program is not limited to the opening of the web page of the video website. The user opening any web page containing video content may trigger the browser to send the instruction for creating a video window to the web service program.

To enable the browser to send the instruction for creating a video window to the web service program, it is necessary to establish communication connection between the browser and the web service program.

When the web service program is a websocket service program, the websocket service program needs to establish a connection with the browser. After the connection is established successfully, the websocket service program may communicate with the browser. When the web service program is an http service program, the http service program may directly communicate with the browser.

After the communication connection between the browser and the web service program is established, the browser sends the instruction for creating a video window to the web service program. The web service program receives the instruction for creating a video window and calls the preset interface to create a video window.

For example, the preset interface may be a creation interface or other specified interfaces that may create a video window.

At S102, the video window is displayed in a page in which a current window of a browser is located.

In order for a user to watch a video, after creating the video window, the video window is displayed in the page in which the current window of the browser is located.

In general, the video window is displayed immediately after the video window is created. However, after the video window is created, if the created video window is hidden due to some reasons, it is necessary to call an open interface to open the hidden video window, and then display the video window in the page in which the current window of the browser is located.

There are various manners to display the video window in the page in which the current window of the browser is located, including, but limited to, the following manners.

In a first manner, the video window is displayed as a sub-window of the current window of the browser.

After the web service program creates the video window, it is determined in which manner the video window is displayed in the current window of the browser. For example, the video window is displayed as the sub-window of the current window of the browser or is displayed in front of the current window of the browser.

Because the video window created by the web service program is not a window of the browser, the video window may be displayed as the sub-window of the current window of the browser to avoid the user to feel that the video window is separated from the current window of the browser. That is, the current window is a parent window of the video window, and the relationship between the current window and the video window is a parent-child relationship. Therefore, the video window is embedded into the current window of the browser as a sub-window to achieve an effect of the integration of the video window with the current window.

Due to the parent-child relationship between the current window and the video window, in this manner, an operating system needs to support a parent-child window mode, for example, the operating system is a system such as Windows.

Figure 2:
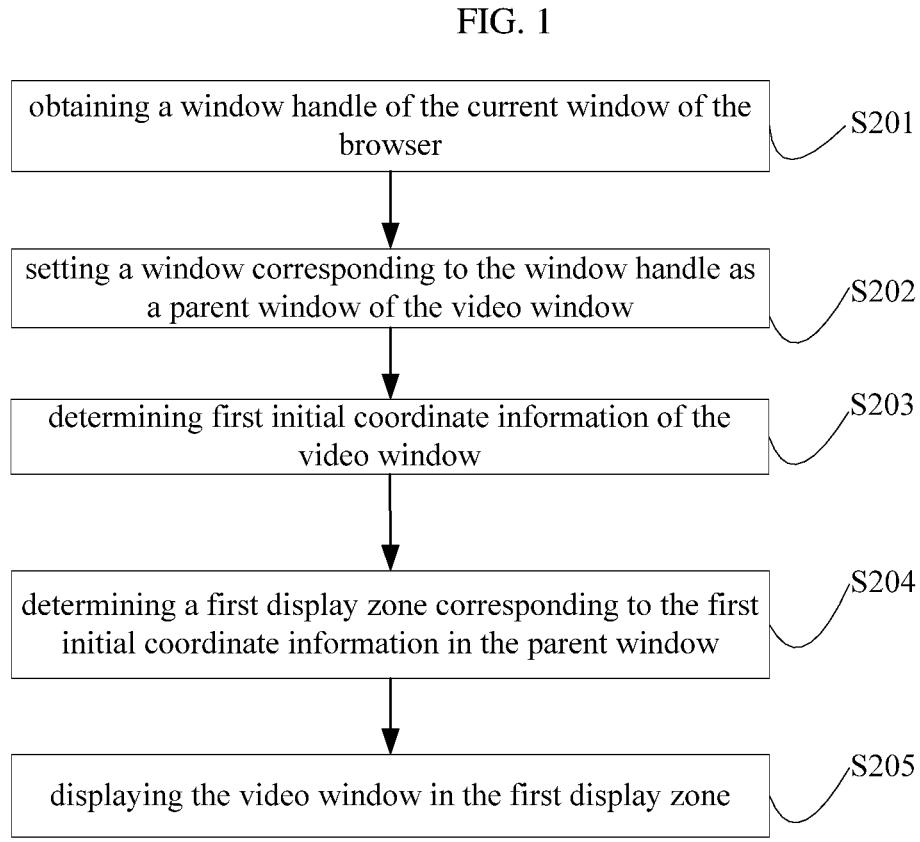
FIG. 2 is a flow diagram of displaying a video window as a sub-window of a current window of a browser according to an embodiment of the present application.

Referring to FIG. 2, the displaying of the video window as the sub-window of the current window of the browser may include the following steps.

At S201, a window handle of the current window of the browser is obtained.

Since multiple windows in the browser may be opened simultaneously, it is necessary to obtain the window handle of the current window of the browser, so as to learn that the video window is to be displayed as a sub-window of which video window. The window handle is a globally unique identifier of a window.

At S202, a window corresponding to the window handle is set as the parent window of the video window.

After the window handle of the current window of the browser is obtained, that is, the video window as whose sub-window the video window is to be displayed is learned, the window corresponding to the window handle is set as the parent window of the video window.

At S203, first initial coordinate information of the video window is determined.

It is determined in which manner the video window is displayed in the current window of the browser after the web service program creates the video window, but if the video window is displayed in any position of the current window of the browser, for example, at the bottom of the page in which the current window is located, then the user cannot view the video window immediately, which causes inconvenience to the user for viewing the video window. Therefore, after the web service program creates the video window, the browser will preset a display position for the video window, for example, a middle position of the page in which the current window is located.

Then, the browser sends the display position for the video window to the web service program, that is, sends the first initial coordinate information of the video window to the web service program. The web service program receives the first initial coordinate information of the video window.

The first initial coordinate information may be coordinates of vertices of four corners of the video window or coordinates of vertices of two diagonal corners of the video window, which will be not limited herein.

Since the web service program has received the first initial coordinate information of the video window after creating the video window, in order to display the video window in the current window of the browser, the first initial coordinate information is determined after the window corresponding to the window handle is set as the parent window of the video window.

At S204, a first display zone corresponding to the first initial coordinate information in the parent window is determined.

After the first initial coordinate information for the video window is determined, in order to determine a position in which the video window is displayed in the parent window, it is necessary to determine the first display zone corresponding to the first initial coordinate information in the parent window.

For example, if the first initial coordinate information is the coordinates of vertices of four corners of the video window, then a zone determined from the coordinates of the vertices of the four corners in the parent window is the first display zone.

At S205, the video window is displayed in the first display zone.

After the first display zone is determined, the video window may be displayed in the first display zone.

In this way, the video window is embedded into the current window of the browser as the sub-window by setting the current window as the parent window of the video window and displaying the video window in the first display zone determined from the first initial coordinate information, to achieve an effect of the integration of the video window with the current window.

In a second manner, the video window is displayed in front of the current window of the browser.

Because the video window created by the web service program is not a window of the browser, the video window may be displayed independent of the current window of the browser, i.e., the video window is displayed in front of the current window of the browser.

In a case where the current window of the browser may be covered or partially sheltered, the video window is no longer displayed in front of the current window of the browser. There are many cases where the current window of the browser is covered or partially sheltered, which include, but not limited to, the following cases.

In a first case:

when a user opens a further window, such as a text window, other than the browser, the further window may shelter a part of the current window of the browser, that is, the part of the current window of the browser is sheltered; or, the further window may cover the current window of the browser, that is, the current window of the browser is covered.

In a second case:

when a further window of the browser that is opened, the opened window becomes a current window of the browser. At this time, the original current window of the browser is covered.

This manner may be applied to any operating system. An operating system that doesn't support the parent-child window mode, such as Mac system, may also use this manner.

Figure 3:
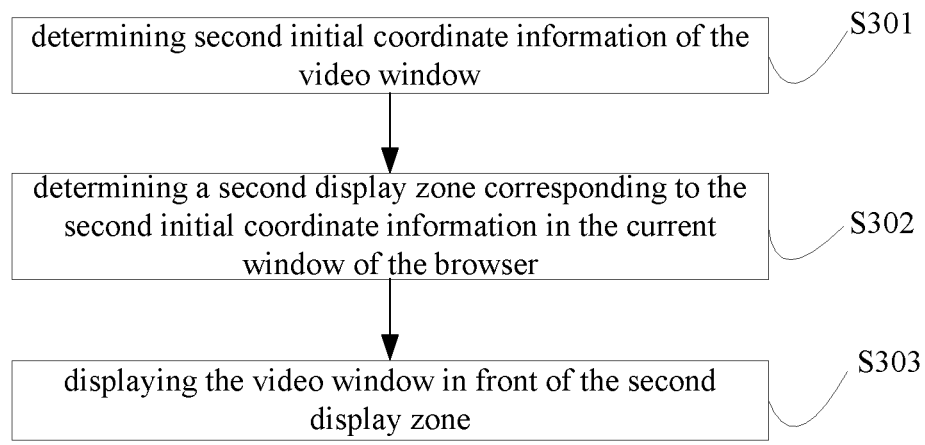
FIG. 3 is a flow diagram of displaying a video window in front of a current window of a browser according to an embodiment of the present application.

Referring to FIG. 3, the displaying of the video window in front of the current window of the browser may include the following steps.

At S301, second initial coordinate information of the video window is determined.

It is determined in which manner the video window is displayed in the current window of the browser after the web service program creates the video window, but if the video window is displayed in any position of the current window of the browser, for example, at the bottom of the page in which the current window is located, the user is unable to view the video window immediately, which causes inconvenience to the user for viewing the video window. Therefore, after the web service program creates the video window, the browser will preset a display position for the video window, for example, the middle position of the page in which the current window is located.

Then, the browser sends to the web service program a position where the video window is displayed in the front, i.e., sends second initial coordinate information of the video window to the web service program, and the web service program receives the second initial coordinate information of the video window.

The second initial coordinate information may be the coordinates of vertices of four corners of the video window or the coordinates of vertices of two diagonal corners of the video window, which will be not limited herein.

Since the web service program has received the second initial coordinate information of the video window after creating the video window, it is necessary to determine the second initial coordinate information in order to display the video window in the current window of the browser.

At S302, a second display zone corresponding to the second initial coordinate information in the current window of the browser is determined.

After the second initial coordinate information of the video window is determined, in order to determine a position where the video window is displayed in the front, it is necessary to determine the second display zone corresponding to the second initial coordinate information in the current window of the browser.

For example, if the second initial coordinate information is the coordinates of vertices of four corners of the video window, a zone determined from the coordinates of the vertices of the four corners in the current window is the second display zone.

At S303, the video window is displayed in front of the second display zone.

After the second display zone is determined, the video window may be displayed in the second display zone.

The video window is displayed in front of the current window of the browser by displaying the video window in front of the second display zone determined from the second initial coordinate information. Since the video window is displayed in front of the current window of the browser, the video window is not separated from the current window of the browser visually, achieving an effect of the integration of the video window with current window.

At S103, a video playing instruction is received.

In general, a video list is displayed in the video website. When a user wants to watch a video on a certain web page, the user sends a video playing request to the browser. After receiving the video playing request, the browser learns that the user wants to watch the video on the web page corresponding to the video playing request. At this time, the browser sends the video playing instruction to the web service program. The web service program receives the video playing instruction and learns that the user wants to watch the video corresponding to the video playing instruction.

At S104, a video corresponding to the video playing instruction is played in the video window.

After the video playing instruction is received, the video corresponding to the video playing instruction may be played in the video window. Therefore, the user may watch the video on the page of the browser.

In the embodiment of the present application, the web service program calls the preset interface to create the video window, displays the video window in the page in which the current window of the browser is located, receives the video playing instruction, and plays the video corresponding to the video playing instruction in the video window. In the present application, the web service program creates the video window, displays the created video window in the page in which the current window of the browser is located, and plays a video through the video window without loading a plug-in, achieving the purpose of playing a video on the page of the browser without using a plug-in.

A user may change a position or a size of the current window of the browser for different reasons in watching a video. For example, the user opens a Word file in watching the video, thus the current window of the browser is required to be moved to an unobvious position and the current window of the browser is zoomed out to view the Word file.

Figure 4:
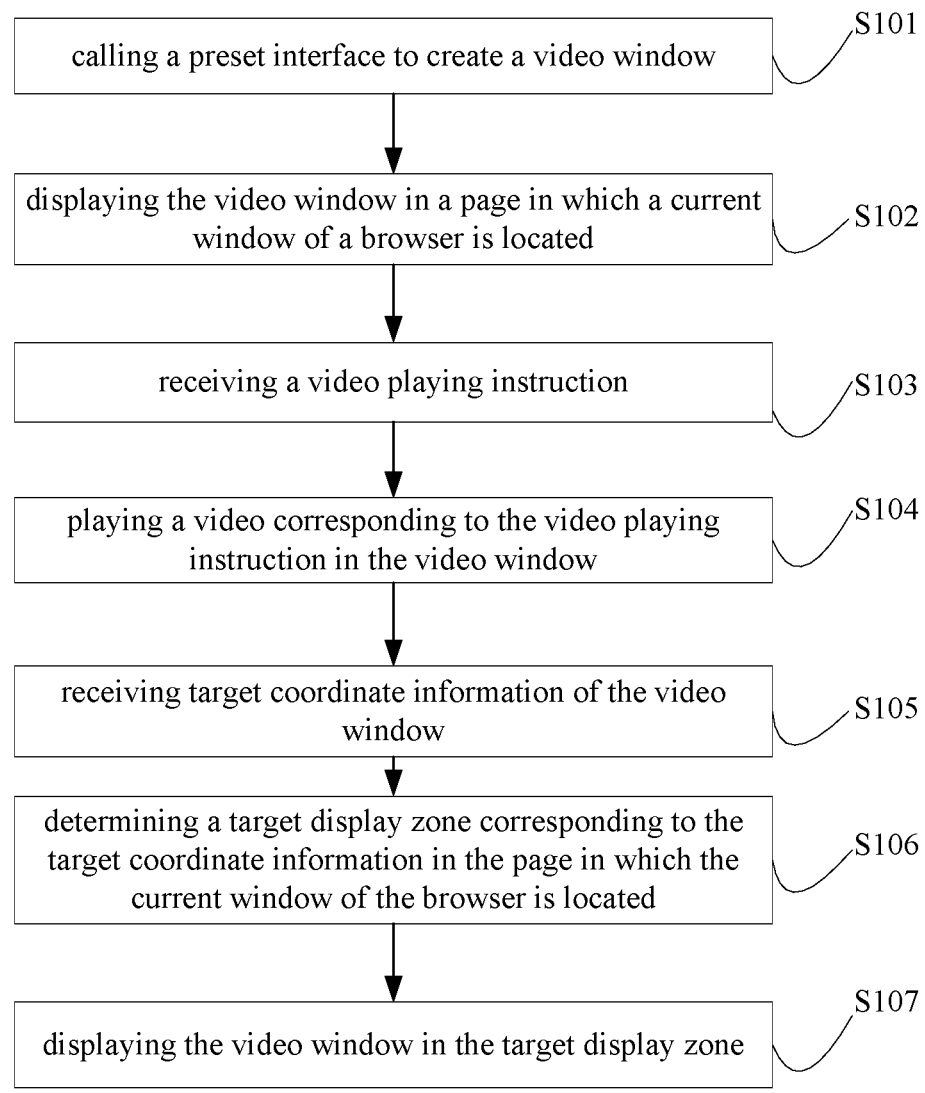
FIG. 4 is a second flow diagram of a method for video playing according to an embodiment of the present application.

In order to achieve an effect of the integration of the video window with the current window, when the position or the size of the current window of the browser changes, it is necessary to dynamically change the position or the size of the video window. Therefore, as shown in FIG. 4, based on the method shown in FIG. 1, when the position or the size of the current window changes, the method may further include the following steps.

At S105, target coordinate information of the video window is received, wherein the target coordinate information indicates a position to which the video window is to be changed.

In playing the video corresponding to the video playing instruction in the video window, if the position or the size of the current window of the browser changes, the browser calculates coordinate information of the video window, i.e., the target coordinate information of the video window, and sends the target coordinate information to the web service program. The web service program receives the target coordinate information.

At S106, a target display zone corresponding to the target coordinate information, in a page in which the current window of the browser is located, is determined.

After the target coordinate information is received, i.e., the coordinate information of the position to which the video window is to be changed is learned, in order to determine a display position of the changed video window, it is necessary to determine the target display zone, corresponding to the target coordinate information, in the page in which the current window of the browser is located.

When the video window is displayed as the sub-window of the current window of the browser, determining the target display zone, corresponding to the target coordinate information, in the page in which the current window of the browser is located may include: determining the target display zone, corresponding to the target coordinate information, in the parent window.

When the video window is displayed in front of the current window of the browser, determining the target display zone, corresponding to the target coordinate information, in the page in which the current window of the browser is located may include: determining the target display zone, corresponding to the target coordinate information, in the current window.

At S107, the video window is displayed in the target display zone.

After the target display zone is determined, the video window may be displayed in the target display zone.

When the video window is displayed as the sub-window of the current window of the browser, the video window may be directly displayed in the target display zone. When the video window is displayed in front of the current window of the browser, displaying the video window in the target display zone may include: displaying the video window in front of the target display zone.

By receiving the target coordinate information of the video window and displaying the video window in the target display zone determined from the target coordinate information, an effect that the video window changes with the change of the current window of the browser is achieved.

The change of the video window with the change of the current window of the browser includes not only the change of position and the change of size, but also other changes of the window, for example, the hiding of the window, the folding of the window, the destruction of the window or the like, which will be not limited herein.

Figure 5:
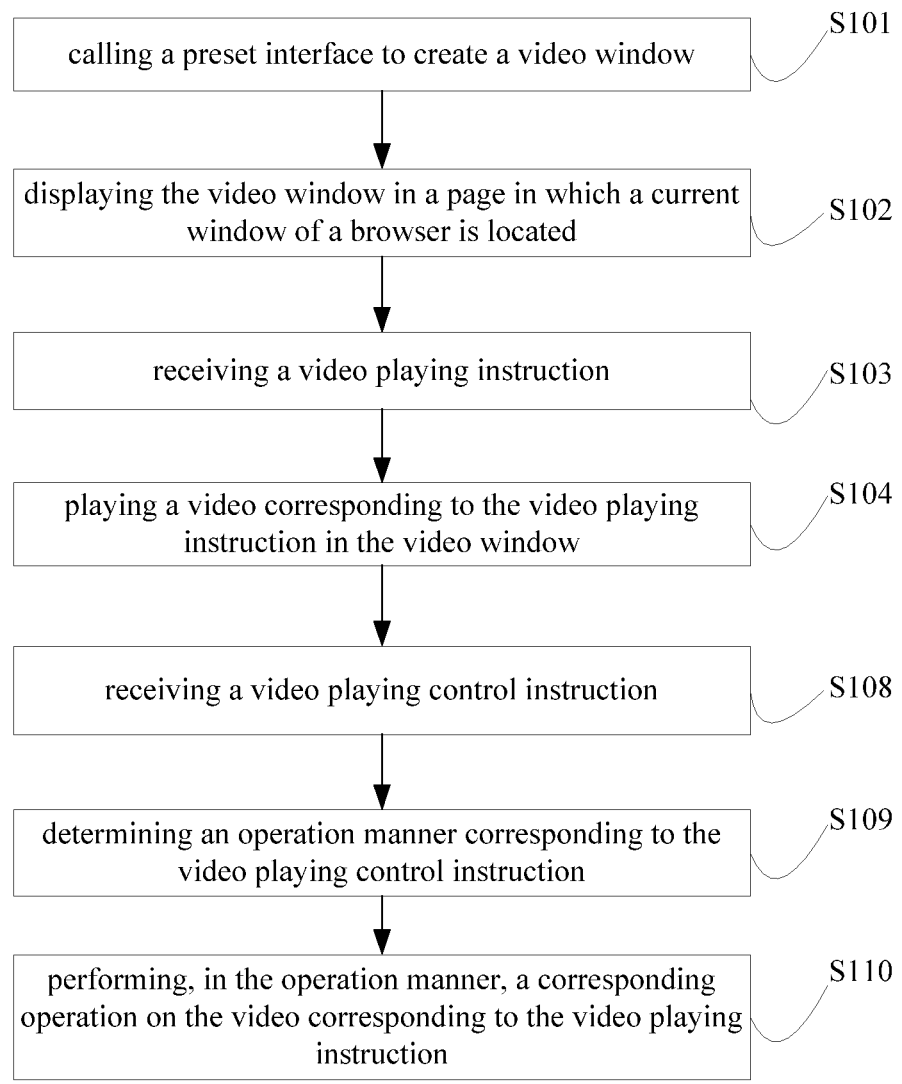
FIG. 5 is a third flow diagram of a method for video playing according to an embodiment of the present application.

Based on the method shown in FIG. 1, as shown in FIG. 5, the method may further include the following steps.

At S108, a video playing control instruction is received.

A user may control the playing of the video, for example, playing back the video, during watching a video. The browser sends the video playing control instruction to the web service program, and the web service program receives the video playing control instruction.

At S109, an operation manner corresponding to the video control instruction is determined.

After the video playing control instruction is received, the operation manner corresponding to the video playing control instruction is determined. After the operation manner is determined, it is learned which operation the user needs to perform on the watched video.

At S110, a corresponding operation is performed, in the operation manner, on the video corresponding to the video playing instruction.

After the operation manner corresponding to the video control instruction is determined, the corresponding operation may be performed, in the operation manner, on the video corresponding to the video playing instruction, for example, playing back the video.

In this way, by receiving the video control instruction, the web service program may achieve the purpose of performing a video operation on the video corresponding to the video playing instruction.

Figure 6:
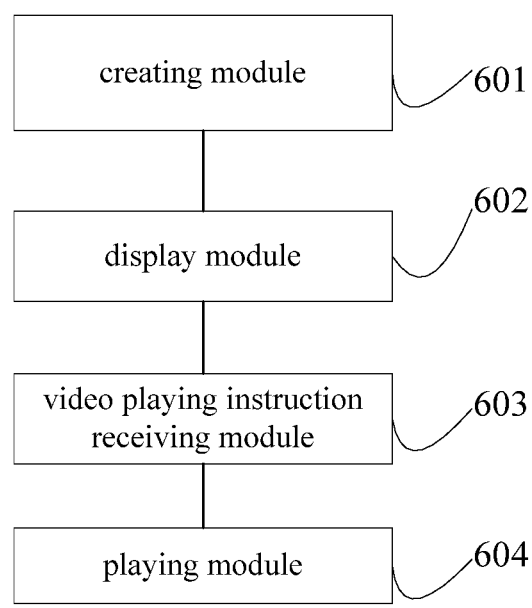
FIG. 6 is a structural diagram of an apparatus for video playing according to an embodiment of the present application.

Corresponding to the embodiment of the method above, an embodiment of the present application further provides an apparatus for video playing. As shown in FIG. 6, the apparatus is applied to the web service program, and may include:

a creating module 601 configured for calling a preset interface to create a video window;

a display module 602 configured for displaying the video window in a page in which a current window of a browser is located;

a video playing instruction receiving module 603 configured for receiving a video playing instruction; and a playing module 604 configured for playing a video corresponding to the video playing instruction in the video window.

In the embodiment of the present application, the web service program calls the preset interface to create the video window, displays the video window in the page in which the current window of the browser is located, receives the video playing instruction, and plays the video corresponding to the video playing instruction in the video window. In the present application, the web service program creates the video window, displays the created video window in the page in which the current window of the browser is located, and plays a video through the video window without loading a plug-in, achieving the purpose of playing a video on the page of the browser without using a plug-in.

In an implementation of the present application, the web service program is a full-duplex communication protocol (websocket) service program or a Hyper Text Transfer Protocol (http) service program.

In an implementation of the present application, the display module 603 may be further configured for:

displaying the video window as a sub-window of the current window of the browser.

In an implementation of the present application, the display module 603 may be further configured for:

displaying the video window in front of the current window of the browser.

In an implementation of the present application, the display module 603 may include:

a window handle obtaining unit configured for obtaining a window handle of the current window of the browser;

a setting unit configured for setting a window corresponding to the window handle as a parent window of the video window;

a first initial coordinate information determining unit configured for determining first initial coordinate information of the video window;

a first display zone determining unit configured for determining a first display zone corresponding to the first initial coordinate information in the parent window; and a first display unit configured for displaying the video window in the first display zone.

In an implementation of the present application, the display module 603 may include:

a second initial coordinate information determining unit configured for determining second initial coordinate information of the video window;

a second display zone determining unit configured for determining a second display zone corresponding to the second initial coordinate information in the current window of the browser; and a second display unit configured for displaying the video window in front of the second display zone.

In an implementation of the present application, the apparatus may include:

a target coordinate information receiving module configured for, when a position or a size of the current window changes, receiving target coordinate information of the video window;

a target display zone determining module configured for determining a target display zone corresponding to the target coordinate information in the page in which the current window of the browser is located; and a target display module configured for displaying the video window in the target display zone.

In an implementation of the present application, the apparatus may further include:

a video playing control instruction receiving module configured for, after playing a video corresponding to a video playing request in the video window, receiving a video playing control instruction;

an operation manner determining module configured for determining an operation manner corresponding to the video playing control instruction; and a performing module configured for performing, in the operation manner, a corresponding operation on the video corresponding to the video playing instruction.

Figure 7:
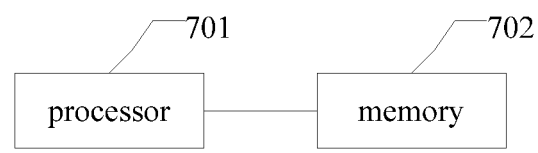
FIG. 7 is a structural diagram of an electronic device according to an embodiment of the present application.

An embodiment of the present application further provides an electronic device, as shown in FIG. 7, including a processor 701 and a memory 702.

The memory 702 is configured for storing a computer program.

The processor 701 is configured for performing the program stored on the memory 702 to perform the method for video playing. The method includes:

calling a preset interface to create a video window; displaying the video window in a page in which a current window of a browser is located; receiving a video playing instruction; and playing a video corresponding to the video playing instruction in the video window.

In the embodiment of the present application, the web service program calls the preset interface to create the video window, displays the video window in the page in which the current window of the browser is located, receives the video playing instruction, and plays the video corresponding to the video playing instruction in the video window. In the present application, the web service program creates the video window, displays the created video window in the page in which the current window of the browser is located, and plays a video through the video window without loading a plug-in, achieving the purpose of playing a video on the page of the browser without using a plug-in.

In an implementation of the present application, the web service program is a full-duplex communication protocol (websocket) service program or a Hyper Text Transfer Protocol (http) service program.

In an implementation of the present application, displaying the video window in the page in which the current window of the browser is located may include:

displaying the video window as a sub-window of the current window of the browser.

In an implementation of the present application, displaying the video window in the page in which the current window of the browser is located may include:

displaying the video window in front of the current window of the browser.

In an implementation of the present application, displaying the video window as the sub-window of the current window of the browser may include:

receiving first initial coordinate information of the browser; obtaining a window handle of the current window of the browser; setting a window corresponding to the window handle as a parent window of the video window; determining first initial coordinate information of the video window; determining a first display zone corresponding to the first initial coordinate information in the parent window; and displaying the video window in the first display zone.

In an implementation of the present application, displaying the video window in front of the current window of the browser may include:

determining second initial coordinate information of the video window; determining a second display zone corresponding to the second initial coordinate information in the current window of the browser; and displaying the video window in front of the second display zone.

In an implementation of the present application, when a position or a size of the current window changes, the method may further include:

receiving target coordinate information of the video window; determining a target display zone corresponding to the target coordinate information in the page in which the current window of the browser is located; and displaying the video window in the target display zone.

In an implementation of the present application, after playing a video corresponding to a video playing request in the video window, the method may further include:

receiving a video playing control instruction; determining an operation manner corresponding to the video playing control instruction; and performing, in the operation manner, a corresponding operation on the video corresponding to the video playing instruction.

The memory in the electronic device may include a Random Access Memory (RAM), or may include Non-Volatile Memory (NVM), for example at least one disk memory. Optionally, the memory may also be at least one storage apparatus located away from the processor.

The processor described above may be a general-purpose processor, including a Central Processing Unit (CPU), a Network Processor (NP), etc.; it may also be a Digital Signal Processing (DSP), an Application Specific Integrated Circuit (ASIC), a Field-Programmable Gate Array (FPGA) or other programmable logic devices, discrete gate or transistor logic devices, discrete hardware components.

Another embodiment of the present application further provides a computer-readable storage medium having stored a web service program therein. The web service program is executed by a processor, so as to cause the processor to perform a method for video playing. The method includes:

calling a preset interface to create a video window; displaying the video window in a page in which a current window of a browser is located; receiving a video playing instruction; and displaying a video corresponding to the video playing instruction in the video window.

In the embodiment of the present application, the web service program calls the preset interface to create the video window, displays the video window in the page in which the current window of the browser is located, receives the video playing instruction, and plays the video corresponding to the video playing instruction in the video window. In the present application, the web service program creates the video window, displays the created video window in the page in which the current window of the browser is located, and plays a video through the video window without loading a plug-in, achieving the purpose of playing a video on the page of the browser without using a plug-in.

In an implementation of the present application, the web service program is a full-duplex communication protocol (websocket) service program or a Hyper Text Transfer Protocol (http) service program.

In an implementation of the present application, displaying the video window in the page in which the current window of the browser is located may include:

displaying the video window as a sub-window of the current window of the browser.

In an implementation of the present application, displaying the video window in the page in which the current window of the browser is located may include:

displaying the video window in front of the current window of the browser.

In an implementation of the present application, displaying the video window as the sub-window of the current window of the browser may include:

obtaining a window handle of the current window of the browser; setting a window corresponding to the window handle as a parent window of the video window; determining first initial coordinate information of the video window; determining a first display zone corresponding to the first initial coordinate information in the parent window; and displaying the video window in the first display zone.

In an implementation of the present application, displaying the video window in front of the current window of the browser may include:

determining second initial coordinate information of the video window; determining a second display zone corresponding to the second initial coordinate information in the current window of the browser; and displaying the video window in front of the second display zone.

In an implementation of the present application, when a position or a size of the current window changes, the method may further include:

receiving target coordinate information of the video window; determining a target display zone corresponding to the target coordinate information in the page in which the current window of the browser is located; and displaying the video window in the target display zone.

In an implementation of the present application, after playing a video corresponding to a video playing request in the video window, the method may further include:

receiving a video playing control instruction; determining an operation manner corresponding to the video playing control instruction; and performing, in the operation manner, a corresponding operation on the video corresponding to the video playing instruction.

It should be noted that the relationship terms used herein, such as "first", "second" and the like are only to distinguish one entity or operation from another entity or operation, but do not necessarily require or imply that there is any actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments may refer to one another. In addition, the description for each embodiment focuses on the differences from other embodiments. In particular, the embodiment of the apparatus shown in FIG. 6, the embodiment of the electronic device shown in FIG. 7, and the embodiment of the computer-readable storage medium are described briefly, since they are basically similar to the embodiment of the method shown in FIG. 1, and the related contents may refer to the description of the embodiment of the method shown in FIG. 1.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for video playing, which is applied to a web service program, comprising:
    calling a preset interface to create a video window;
    receiving a display position for the video window sent by a browser;
    displaying the video window in a page in which a current window of a browser is located;
    receiving a video playing instruction, which is sent to the web service program by the browser; and
    playing a video corresponding to the video playing instruction in the video window.

2. The method of claim 1, wherein, the web service program is a full-duplex communication protocol (websocket) service program or a Hyper Text Transfer Protocol (http) service program.

3. The method of claim 1, wherein, displaying the video window in the page in which the current window of the browser is located comprises:
    displaying the video window as a sub-window of the current window of the browser.

4. The method of claim 3, wherein, displaying the video window as the sub-window of the current window of the browser comprises:
    obtaining a window handle of the current window of the browser;
    setting a window corresponding to the window handle as a parent window of the video window;
    determining first initial coordinate information of the video window;
    determining a first display zone corresponding to the first initial coordinate information in the parent window; and
    displaying the video window in the first display zone.

5. The method of claim 1, wherein, displaying the video window in the page in which the current window of the browser is located comprises:
    displaying the video window in front of the current window of the browser.

6. The method of claim 4, wherein, displaying the video window in front of the current window of the browser comprises:
    determining second initial coordinate information of the video window;
    determining a second display zone corresponding to the second initial coordinate information in the current window of the browser; and
    displaying the video window in front of the second display zone.

7. The method of claim 1, wherein, when a position or a size of the current window changes, the method further comprises:
    receiving target coordinate information of the video window, wherein the target coordinate information indicates a position to which the video window is to be changed;
    determining a target display zone corresponding to the target coordinate information in the page in which the current window of the browser is located; and
    displaying the video window in the target display zone.

8. The method of claim 1, wherein, after playing a video corresponding to a video playing request in the video window, the method further comprises:
    receiving a video playing control instruction;
    determining an operation corresponding to the video playing control instruction; and
    performing the operation on the video corresponding to the video playing instruction.

9. A non-transitory computer-readable storage medium having stored a computer program therein, wherein the computer program is executed by a processor, so as to cause the processor to perform the method of claim 1.

10. An electronic device, comprising a processor and a memory, wherein,
    the memory is configured for storing a computer program;
    the processor is configured for performing the computer program stored on the memory to perform operations of:
    calling a preset interface to create a video window;
    receiving a display position for the video window sent by a browser;
    displaying the video window in a page in which a current window of a browser is located;
    receiving a video playing instruction, which is sent to the web service program by the browser; and
    playing a video corresponding to the video playing instruction in the video window.

11. The electronic device of claim 10, wherein, the web service program is a full-duplex communication protocol (websocket) service program or a Hyper Text Transfer Protocol (http) service program.

12. The electronic device of claim 10, wherein, displaying the video window in the page in which the current window of the browser is located comprises:
   displaying the video window as a sub-window of the current window of the browser.

13. The electronic device of claim 12, wherein, displaying the video window as the sub-window of the current window of the browser comprises:
   obtaining a window handle of the current window of the browser;
   setting a window corresponding to the window handle as a parent window of the video window;
   determining first initial coordinate information of the video window;
   determining a first display zone corresponding to the first initial coordinate information in the parent window; and
   displaying the video window in the first display zone.

14. The electronic device of claim 10, wherein, displaying the video window in the page in which the current window of the browser is located comprises:
   displaying the video window in front of the current window of the browser.

15. The electronic device of claim 14, wherein, displaying the video window in front of the current window of the browser comprises:
   determining second initial coordinate information of the video window;
   determining a second display zone corresponding to the second initial coordinate information in the current window of the browser; and
   displaying the video window in front of the second display zone.

16. The electronic device of claim 10, wherein, the processor is further configured for:
   receiving target coordinate information of the video window, wherein the target coordinate information indicates a position to which the video window is to be changed;
   determining a target display zone corresponding to the target coordinate information in the page in which the current window of the browser is located; and
   displaying the video window in the target display zone.

17. The electronic device of claim 10, wherein, the processor is further configured for:
   receiving a video playing control instruction;
   determining an operation corresponding to the video playing control instruction; and
   performing the operation on the video corresponding to the video playing instruction.

* * * * *